United States Patent
Dhanantwari et al.

(10) Patent No.: US 8,180,124 B2
(45) Date of Patent: May 15, 2012

(54) REGISTRATION METHOD FOR PROJECTIONS IN DUAL ENERGY

(76) Inventors: Amar Dhanantwari, Toronto (CA); Jeffrey H. Siewerdsen, Toronto (CA); Richard L. VanMetter, Washington, DC (US)

(*) Notice: Subject to any disclaimer, the term of this patent is extended or adjusted under 35 U.S.C. 154(b) by 788 days.

(21) Appl. No.: 12/052,011

(22) Filed: Mar. 20, 2008

(65) Prior Publication Data

US 2008/0247626 A1 Oct. 9, 2008

Related U.S. Application Data

(60) Provisional application No. 60/896,322, filed on Mar. 22, 2007.

(51) Int. Cl.
 *G06K 9/00* (2006.01)
(52) U.S. Cl. .......... 382/128; 382/131; 382/132
(58) Field of Classification Search .......... 382/128, 382/131, 132, 294
See application file for complete search history.

(56) References Cited

U.S. PATENT DOCUMENTS

| | | | |
|---|---|---|---|
| 6,661,873 B2 | 12/2003 | Jabri et al. | |
| 7,117,026 B2 | 10/2006 | Shao et al. | |
| 2001/0021264 A1* | 9/2001 | Armato et al. | 382/132 |
| 2006/0002601 A1* | 1/2006 | Fu et al. | 382/132 |
| 2007/0133736 A1 | 6/2007 | Chen et al. | |
| 2007/0196007 A1 | 8/2007 | Chen et al. | |
| 2007/0206880 A1* | 9/2007 | Chen et al. | 382/294 |

* cited by examiner

Primary Examiner — Claire X Wang

(57) ABSTRACT

A method is disclosed for resolving misregistration errors resulting from dual energy double-shot projection radiographic image acquisition. The method involves an iterative multi-scale, multi-resolution registration process that corrects misregistration errors progressively at scales ranging from bulk anatomical drift down to smaller scale motion such as that of fine pulmonary vasculature. The method may be incorporated as part of a dual energy image processing chain to create dual energy images with improved image quality and diagnostic performance.

19 Claims, 3 Drawing Sheets

REGISTRATION METHOD FOR PROJECTIONS IN DUAL ENERGY

CROSS REFERENCE TO RELATED APPLICATIONS

This application claims the benefit of U.S. Provisional Application No. 60/896,322 filed Mar. 22, 2007.

FIELD OF THE INVENTION

The invention relates generally to the field of medical imaging and in particular to the field of dual energy projection image processing. More specifically, the invention relates to a projection image registration method operating at various levels of scale and resolution to resolve misregistration errors prior to dual energy decomposition.

BACKGROUND OF THE INVENTION

In dual energy imaging, two images of the same object are acquired under different x-ray beam conditions, such as beam energy and filtration. For example, high- and low-energy images of the same object can be acquired. These images can then be decomposed to produce material specific images, such as soft-tissue and bone-only images.

Double-shot acquisition, which requires a time lapse between acquisition of the high- and low-energy images, promotes detective quantum efficiency and provides an improved detectability index for dual energy imaging as compared to sandwiched detectors. The use of double-shot acquisition, however, introduces the potential for misregistration between the high- and low-energy images. In particular, misregistration occurs as a result of anatomical motion during the time between the two images. Misregistration between the high- and low-energy images may result in artifacts in a combined image.

Misregistration as a result of anatomical motion may occur at various scales. For example, misregistration may occur as a result of bulk anatomical motion of the patient between acquisitions. Misregistration may also occur on a smaller scale as a result of cardiac or respiratory motion. Finally, misregistration may occur on an even smaller scale such as motion associated with fine pulmonary vasculature. Therefore, there is a need to provide a projection image registration method operating at various levels of scale and resolution to resolve misregistration errors prior to dual energy decomposition.

SUMMARY OF THE INVENTION

The present invention provides a method of registering a first energy projection radiographic image to a second energy projection radiographic image to correct misregistration errors that occur as a result of anatomical motion between acquisitions. The first energy projection radiographic image may be acquired at a higher energy level than the second energy projection radiographic image.

The registration method of the present invention involves selecting a first dimension size for corresponding regions of interest in the first and second energy projection radiographic images. A region of interest having the selected dimension size in both the first and second energy projection radiographic images is then selected. A registration metric is used to identify a set of transformations that maximize the registration between the first region of interest in the first energy projection radiographic image and the first region of interest in the second energy projection radiographic image. In a preferred embodiment, the registration metric employed maximizes the mutual information between the first and second energy projection radiographic images.

The registration metric is applied to multiple regions of interest having the same dimension size throughout the first and second energy projection radiographic images to register the entire first energy projection radiographic image to the second projection radiographic images. The transformations for each region of interest are then interpolated and smoothed to remove discontinuities that may occur between the individual regions of interest.

The entire process is then repeated on multiple scales by selecting different region of interest dimensions. In a preferred embodiment, the dimensions selected for the region of interest become progressively smaller with each iteration of the process. A number of iterations may be performed to correct misregistration errors on a certain spatial scale. Downsampling may be used to reduce computation complexity in the registration process. The downsampling factor used may be decreased as the dimensions of the region of interest selected are decreased. The iterative process is used to create a registered image where misregistration errors due to anatomical movement on various scales have been corrected. The registered image can be utilized to create dual energy images such as soft-tissue or bone-only images.

BRIEF DESCRIPTION OF THE DRAWINGS

The foregoing and other objects, features, and advantages of the invention will be apparent from the following more particular description of the embodiments of the invention.

DETAILED DESCRIPTION OF THE INVENTION

Figure 1:
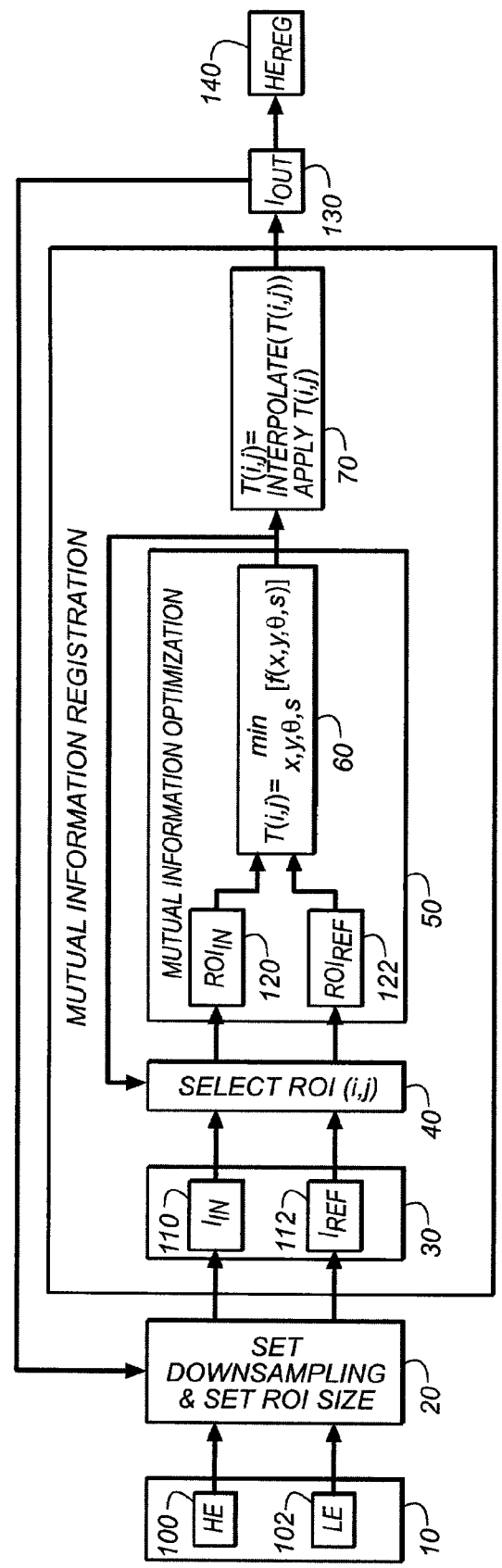
FIG. 1 shows a flow chart illustrating an embodiment of a multi-resolution, multi-scale image registration method.

The following is a detailed description of the preferred embodiments of the invention, reference being made to the drawings in which the same reference numerals identify the same elements of structure in each of the several figures.

FIG. 1 is a flow chart illustrating a multi-resolution, multi-scale image registration method in accordance with an embodiment of the present invention. In step 10 a high-energy image 100 and a low-energy image 102 are acquired utilizing a dual energy acquisition system.

In step 20 the high-energy image 100 and low-energy image 102 are subdivided into regions of interest (ROIs) with particular dimensions. The dimensions of the ROIs may be set by the user or through the image processing software. A downsampling factor may be incorporated for large scale ROIs to reduce the computational complexity of the optimization.

In step 30 the high- and low-energy image data is provided to a dual energy image processing system. Either the high- or low-energy image is set as the reference image in order to register the other image, which is defined as the input image.

In the embodiment displayed in FIG. 1, the high-energy input image 110 is registered to the low-energy reference image 112.

In step 40 a particular ROI having the dimensions selected in step 20 is selected in both the input image 110 and the reference image 112. In step 50 a deformation operation such as a linear translation, scaling, or rotation is applied to register the ROI for the input image ($ROI_{IN}$) 120 to the same ROI for the reference image ($ROI_{REF}$) 122. A registration metric such as cross-correlation or mutual information can then be calculated for the specific deformation operation applied in step 50. A second deformation operation with different values of linear transformation, scaling, or rotation is then applied to the original $ROI_{IN}$ and a second registration metric value is calculated. Comparison of the first and second registration metric values indicates whether the registration is improving or degrading as a result of the deformation operations applied. This iterative process is continued until a specific degree of registration is achieved. As such, this process can be used to indicate when the registration between the $ROI_{IN}$ 120 and the $ROI_{REF}$ 122 is optimal.

In a preferred embodiment, the registration metric applied maximizes the mutual information between the $ROI_{IN}$ 120 and the $ROI_{REF}$ 122. In step 60 a transformation, based on the registration metric employed, is calculated to maximize the registration between the $ROI_{IN}$ 120 and the $ROI_{REF}$ 122. The transformation includes translation, rotation, and scaling of the input image. In a preferred embodiment, the transformation applied maximizes the mutual information between the input and reference images and is computed by minimizing the entropy in the joint histograms. The application of the registration metric is then repeated for various ROIs of the same dimensions throughout the input image 110 and the reference image 112 to register the entire input image to the reference image. In step 70 the ROI transformations are smoothed and interpolated to remove discontinuities at the transitions points between individual ROIs and to determine a pixel-wise transformation of the entire image 130 for the selected ROI dimensions.

The entire process is then repeated from step 20 by subdividing the resulting geometrically morphed high-energy image 130 and the low-energy image 102 into progressively smaller ROIs with reduced downsampling. A pixel-wise transformation of the entire image 130 is produced for each ROI dimension selected. The iteration process is repeated until features of the desired spatial dimensions have been registered.

The final registered image 140 can be utilized along with the low-energy reference image 102 to create dual energy images. Dual energy images created using the iterative multi-scale, multi-resolution registration method exhibit significantly reduced motion artifacts—particularly in the scapulae, aorta, heart, liver, and bronchioles—providing improved image quality and diagnostic performance. In particular, the registration method of the present invention corrects misregistration progressively at scales ranging from bulk anatomical drift down to smaller scale motion such as that of fine pulmonary vasculature.

FIGS. 2A-2H show a series of dual energy images to which the iterative mutual information registration method of the present invention was applied for a case involving a significant time lapse (successive breath-holds) between the acquisition of the high- and low-energy images. The images are 3000×3000 pixels with a pixel pitch of 0.143 mm. The low-energy image was collected at 60 kVp and the high-energy image was collected approximate 6 (±3) seconds later at either 120 kVp or 150 kVp.

Figure 2A:
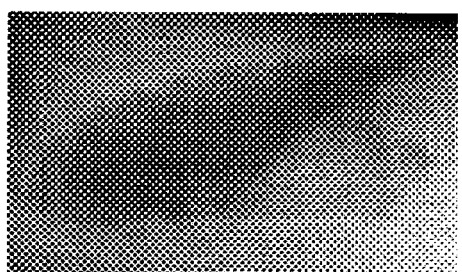
FIGS. 2A through 2H shows dual energy images acquired using the iterative registration method of the present invention for a case involving a significant time lapse (successive breath-holds) between the two projections.
Figure 2B:
Figure 2C:
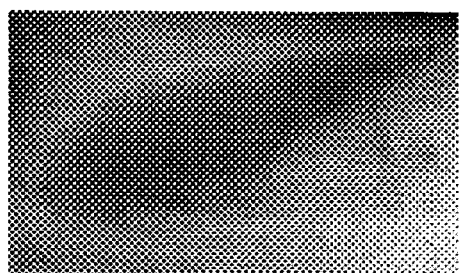
Figure 2D:
Figure 2E:
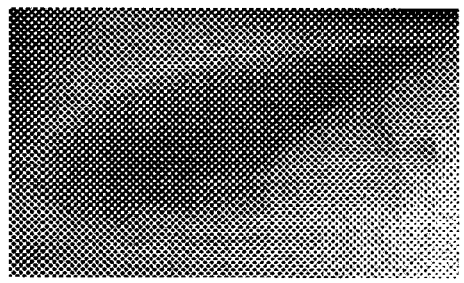
Figure 2F:
Figure 2G:
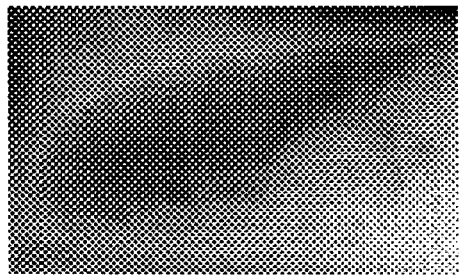
Figure 2H:

The top row shows soft-tissue dual energy images and the bottom row shows bone-only dual energy images. FIGS. 2A and 2B display the unregistered soft-tissue and bone-only images, respectively. The unregistered images include motion artifacts including rib edges, diaphragm misregistration and bulk motion artifacts. FIGS. 2C and 2D show the same images subsequent to a first iteration of the registration process at a scale of 400×400 pixel ROIs and a downsampling factor of 8. FIGS. 2E and 2F show the same images subsequent to a second iteration of the registration process at a scale of 200×200 pixel ROIs and a downsampling factor of 4. Finally, FIGS. 2G and 2H display the same images subsequent to a third iteration of the registration process at a scale of 100×100 pixel ROIs and a downsampling factor of 2. The motion artifacts in the unregistered soft-tissue and bone-only images are progressively minimized as a result of each successive iteration of the multi-scale, multi-resolution registration process.

Figure 3B:
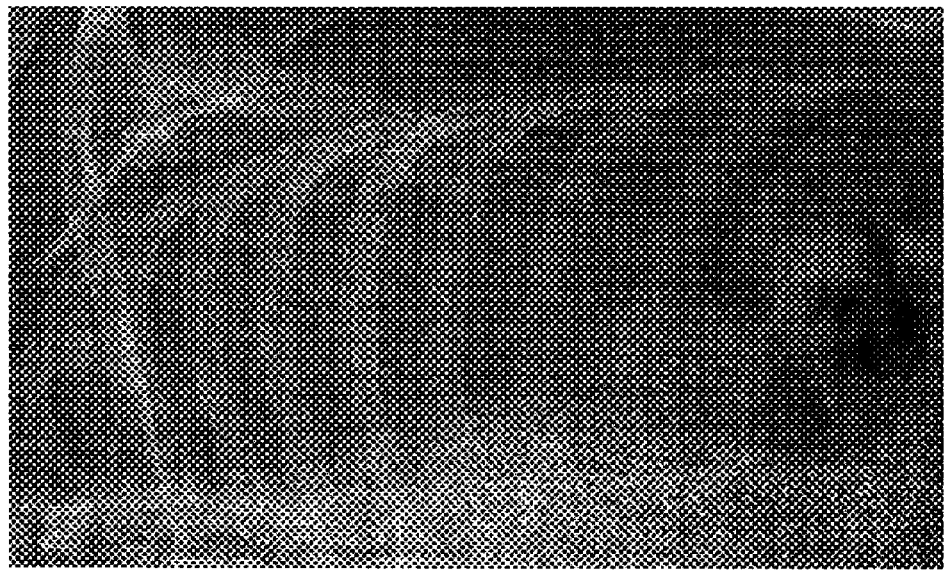
FIGS. 3A and 3B shows bone-only dual energy images illustrating the correction of breathing and cardiac motion utilizing the iterative registration method of the present invention.
Figure 3A:
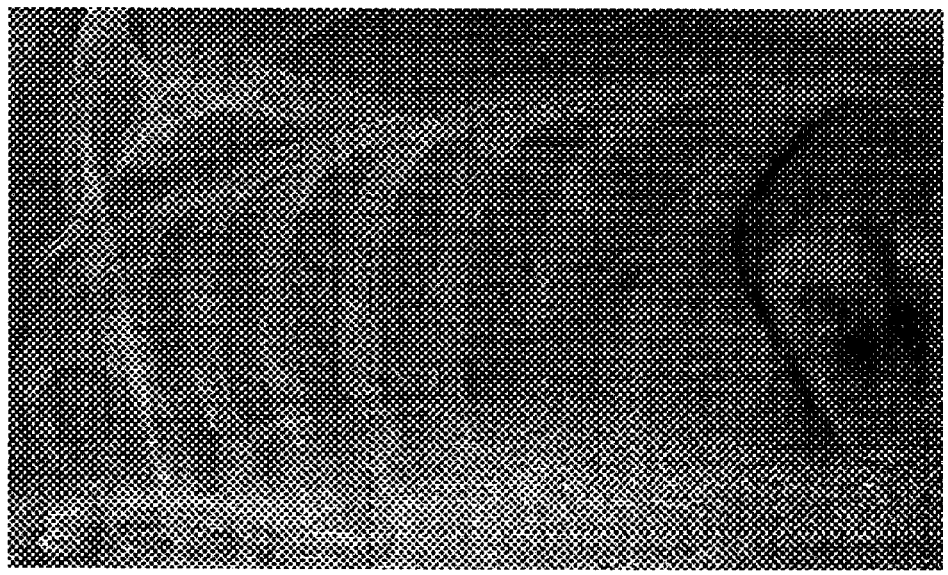

FIGS. 3A and 3B illustrate the correction of motion artifacts as a result of breathing and cardiac motion in a bone-only dual energy image. The image in FIG. 3A shows the unregistered bone-only dual energy image for a patient exhibiting low bulk motion during image acquisition, which is evidenced by the very small displacement of the positional markers in the top right of the images. The unregistered image, however, displays significant internal organ motion, evident in the displacement of the diaphragm. There is also significant "un-cancelled" bronchio-vascular structure in the unregistered image. FIG. 3B represents the same data after application of the iterative registration process of the present invention. The artifacts resulting from abdominal and respiratory motion are significantly reduced. Further, artifacts resulting from cardiac misregistration are reduced after application of the multi-scale, multi-resolution registration process.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A computer implemented method of registering a first energy projection radiographic image ($I_{IN}$) to a second energy projection radiographic image ($I_{REF}$) comprising:
   (a) selecting a first dimension size for corresponding regions of interest in $I_{IN}$ and $I_{REF}$;
   (b) selecting a first region of interest from the corresponding regions of interest having the first dimension size in both $I_{IN}$ and $I_{REF}$;
   (c) applying a deformation operation to the first region of interest in $I_{IN}$;
   (d) utilizing a registration metric that quantifies a degree of registration;
   (e) identifying an optimal deformation operation that optimizes the registration metric;
   (f) applying steps (b) through (e) for consecutive different ones of the corresponding regions of interest in $I_{IN}$ and $I_{REF}$ to register the entire $I_{IN}$ to $I_{REF}$;
   (g) interpolating results of the optimal deformation operation to remove discontinuities between the corresponding regions of interest to create an output image ($I_{OUT}$) that is more registered to $I_{REF}$ than $I_{IN}$; and (h) repeating steps (a) through (g) with a second dimension size for new corresponding regions of interest to iteratively register the $I_{OUT}$ created in step (g) to $I_{REF}$.

2. The computer implemented method of claim 1 wherein the first energy projection radiographic image is acquired at a higher energy level than the second energy projection radiographic image.

3. The computer implemented method of claim 1 wherein the second dimension size is smaller than the first dimension size.

4. The computer implemented method of claim 3 wherein downsampling is utilized to reduce computational complexity.

5. The computer implemented method of claim 4 wherein a downsampling factor is decreased with the second dimension size.

6. The computer implemented method of claim 1 wherein the registration metric maximizes mutual information between the first and second energy projection radiographic images.

7. A computer implemented method of registering a first radiographic image, acquired at a first energy level, to a second radiographic image, acquired at a second energy level, the method comprising:
  selecting a first dimension size for different regions of interest in the first radiographic image and the second radiographic image;
  determining, for each of the different regions of interest, an optimal registration metric by comparing a result of a first deformation operation on each of the different regions of interest using first values and a second deformation operation on the same regions of interest using second values in the first radiographic image;
  transforming each of the different regions of interest based on the optimal registration metric determined for each of the different regions of interest; and
  generating an output image that is more registered to the second radiographic image by interpolating the different regions of interest that have been transformed.

8. The computer implemented method of claim 7, further comprising:
  selecting a second dimension size for new regions of interest in the output image and the second radiographic image;
  determining, for each of the new regions of interest, another optimal registration metric by performing deformation operations on each of the new regions of interest in the output image;
  transforming each of the new regions of interest based on the optimal registration metric determined for each of the new regions of interest; and
  generating a new output image that is more registered to the second radiographic image by interpolating the new regions of interest that have been transformed.

9. The computer implemented method of claim 7, wherein the first energy level is at a higher energy level than the second energy level.

10. The computer implemented method of claim 8, wherein the second dimension size is smaller than the first dimension size.

11. The computer implemented method of claim 10, wherein downsampling is utilized to reduce computational complexity.

12. The computer implemented method of claim 11, wherein a downsampling factor is decreased with the second dimension size.

13. The computer implemented method of claim 7 wherein the optimal registration metric maximizes mutual information between the first radiographic image and the second radiographic image.

14. A computer implemented method of registering a first radiographic image, acquired at a first energy level, to a second radiographic image, acquired at a second energy level, the method comprising:
  selecting a first dimension size for different regions of interest in the first radiographic image and the second radiographic image;
  generating an output image that is more registered to the second radiographic image based on optimal registration metrics determined for each of the different regions of interest and applied to each of the different regions of interest;
  selecting a second dimension size for new regions of interest in the output image and the second radio graphic image;
  generating a new output image that is more registered to the second radiographic image based on optimal registration metrics determined for each of the new regions of interest and applied to each of the new regions of interest.

15. The computer implemented method of claim 14, wherein the first energy level is at a higher energy level than the second energy level.

16. The computer implemented method of claim 14, wherein the second dimension size is smaller than the first dimension size.

17. The computer implemented method of claim 16, wherein downsampling is utilized to reduce computational complexity.

18. The computer implemented method of claim 17, wherein a downsampling factor is decreased with the second dimension size.

19. The computer implemented method of claim 14 wherein the optimal registration metric maximizes mutual information between the first radiographic image and the second radiographic image.

* * * * *